H. OSMUNDSON.
GARDEN SEEDER.
APPLICATION FILED SEPT. 13, 1918.

1,330,275.

Patented Feb. 10, 1920.

INVENTOR:
HENRY OSMUNDSON
By Silas Sweet
Att'y.

UNITED STATES PATENT OFFICE.

HENRY OSMUNDSON, OF SLATER, IOWA, ASSIGNOR TO WILLIAM HOWARD OSMUNDSON, OF PERRY, IOWA.

GARDEN-SEEDER.

1,330,275.   Specification of Letters Patent.   Patented Feb. 10, 1920.

Application filed September 13, 1918. Serial No. 253,867.

*To all whom it may concern:*

Be it known that I, HENRY OSMUNDSON, a citizen of the United States of America, and resident of Slater, Story county, Iowa, have invented a new and useful Garden-Seeder, of which the following is a specification.

The object of this invention is to provide an improved construction for a garden drill and seeder.

A further object of this invention is to provide improved means for rapidly and uniformly planting vegetable and flower seeds.

A further object of this invention is to conserve time, labor and seeds in the planting of vegetable or flower gardens.

A further object of this invention is to provide improved means for mechanically planting seeds at a uniform depth and evenly spaced.

My invention consists in the construction, arrangement and combination of elements hereinafter set forth, pointed out in my claims and illustrated by the accompanying drawing, in which—

Figure 1:
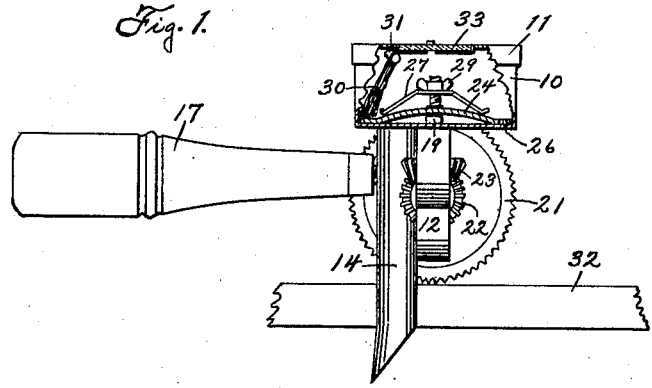
Figure 2:
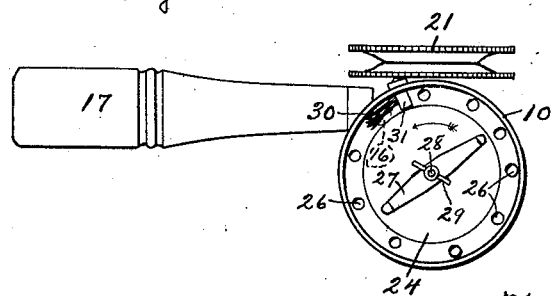
Figure 4:
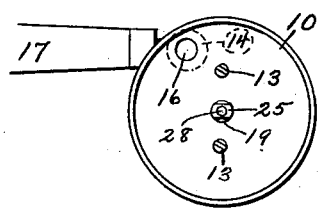
Figure 3:
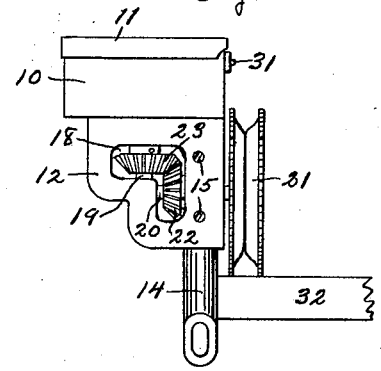

Figure 1 is a side elevation, partly in section, illustrating the device in position for practical use. Fig. 2 is a plan, the cover of the seed hopper being removed. Fig. 3 is a rear elevation of the device. Fig. 4 is a plan of the seed hopper, the cover being removed, as well as the seed plate and brush.

In the construction of the device as shown the numeral 10 designates a seed hopper, preferably of cylindrical form, closed at its bottom and provided with a removable cover 11. A frame 12 is arranged transversely beneath the hopper 10 and secured thereto as by screws 13. A tubular drill stem 14 is fixed to the forward side of the frame 12, as by screws 15, and has its upper end contacting with the bottom of the hopper 10 and its lower end projecting below said frame, and said stem preferably is formed obliquely at its lower margin, the point being arranged forwardly. The hopper 10 is formed with a circular hole 16 in its bottom and adjacent its margin, which hole communicates with the interior of the tubular drill stem 14. A handle 17 is suitably attached to the device and projects forwardly therefrom, in this instance being formed with a threaded stem tapped into the forward side of the drill stem 14. The frame 12 is formed with an opening 18, and a vertical shaft 19 is journaled in said frame, crosses said opening and projects through the bottom of the hopper 10, being arranged axially of said hopper. A horizontal shaft 20 is also journaled in the frame 12, crosses the opening 18 therein, and projects at one side of the frame, and a toothed wheel 21 is secured to the projecting portion of said shaft. A bevel gear 22 is fixed to the horizontal shaft 20, within the opening 18, and meshes with and is adapted to drive a bevel gear 23 fixed to the vertical shaft 19.

A seed plate 24 is provided and is adapted to fit within the hopper 10, said plate preferably being dished or concaved upwardly in its central portion as shown in Fig. 1. The vertical shaft 19 is formed with a flattened portion 25 within the hopper adapted to be received within a central slot in the seed plate 24 to cause said plate to turn with the shaft. The seed plate 24 is formed with an annular row of holes 26 adjacent its margin, adapted to register successively with the hole 16 leading to the drill stem 14. A tension spring 27 is formed with a central opening adapted to receive the upper end of the shaft 19, and has its end portions bearing on the upper face of the seed plate 24. The vertical shaft 19 is formed with a reduced threaded portion 28 at its upper end, and a wing nut 29 is adapted to be screwed thereon to hold the spring 27 in place, and also to provide means for adjusting the tension of said spring. It is the function of the spring 27 and nut 29 to hold the seed plate 24 in position, removably and replaceably, the tension being sufficient to prevent the entrance of seeds from the hopper beneath said plate yet permitting said plate to turn readily in use.

A brush 30, preferably of stiff wires, is fixed at its upper end to a post 31 carried by the upper marginal portion of the hopper 10 and projects downwardly and forwardly from said post toward the bottom of the hopper. When the parts are assembled the lower portion of the brush contacts with the upper face of the seed plate 24 adjacent the annular row of holes 26, and just in front of the exit hole 16 in the bottom of the hopper.

In practical use the parts are arranged as shown and described and seed to be planted, such as small vegetable or flower seed, is placed in the hopper 10, upon the seed plate 24, and the cover 11 placed in position to prevent spilling of the seed. The device is designed to be used in connection with a straight edge such as a board 32 laid upon the ground to indicate by one long margin the position of the row or drill to be planted. The operator grasps the handle 17 and places the device in the position shown in Figs. 1 and 3, relative to the board 32, the drill stem 14 being in contact with one long margin of the board and the toothed wheel 21 contacting the upper face of said board. The device is then drawn toward the operator, sufficient pressure being exerted through the handle 17 to cause the wheel 21 to revolve because of contact with the board, thus causing a rotation of the shaft 20, bevel gear 22, bevel gear 23, vertical shaft 19, and seed plate 24 in the direction of the arrow in Fig. 2. As the seed plate 24 is so rotated and the holes 26 therein brought successively into register with the opening 16 in the bottom of the hopper, seed on said plate are permitted to fall into the tubular drill stem 14, such action being assisted by the brush 30. As the device is drawn along the drill stem 14 enters the earth and forms a trench or drill to receive the seed, the depth of said trench or drill being determined by the thickness of the board used and the amount of projection of said stem beneath the board. In this manner seed within the hopper are deposited regularly in the earth, the trench or drill being formed of uniform depth and the seed being deposited in equal spacing in said trench as the device is drawn along. In practice it is found convenient to incline the end of the handle 17 upwardly slightly.

A plurality of seed plates 24 may be provided and may vary in spacing and diameter of the holes 26 to accommodate seeds of different sizes.

A glazed window 33 may be provided in the cover 11 so that the operator may perceive the amount and condition of seed in the hopper without removing the cover.

The device has been found to be of considerable advantage in conserving time and labor in the planting of small seeds, and also in saving seed as they are not deposited in piles as is apt to be the case where planted by hand.

I claim as my invention—

1. In a device of the character described, a seed hopper having a discharge opening through the bottom thereof, a plate revolubly supported upon the bottom of the seed hopper and having a hole therein arranged to receive seed contained in the hopper and discharge the seed through said opening through the bottom of the hopper, a frame upon which the hopper is supported, a vertical shaft supported by the frame and extending through the bottom of the hopper, a resilient element on said shaft engaging said plate at different points of contact for holding said plate in connection with said shaft and to press said plate against the bottom of the hopper, a pinion attached to said shaft below the hopper, a horizontal shaft journaled in said frame arranged to be rotated as an incident to movement of the device, and a pinion on said horizontal shaft meshing with the pinion on the vertical shaft whereby the vertical shaft and said plate will be rotated from the horizontal shaft.

2. In a device of the character described, a frame, a seed hopper supported by said frame and having a discharge opening through the bottom thereof, a plate revolubly supported upon the bottom of the seed hopper and having an annular series of holes therein arranged to receive seed contained in the hopper and successively discharge the seed through said opening through the bottom of the hopper, a vertical shaft supported by the frame and extending through the bottom of the hopper for rotating said plate to move said holes successively across the discharge opening through the bottom of the hopper, a spring pressing said plate against the bottom, means for varying the pressure of said spring against said plate, a pinion attached to said shaft below the hopper, a horizontal shaft journaled in said frame arranged to be rotated as an incident to movement of the device, and a pinion on said horizontal shaft meshing with the pinion on the vertical shaft whereby the vertical shaft will be rotated by the horizontal shaft.

3. In a device of the character described, a frame, a seed hopper mounted on the frame and having a discharge opening through the bottom thereof, a plate revolubly supported upon the bottom of the seed hopper and having an annular series of holes therein arranged to receive seed contained in the hopper and discharge the seed successively through said opening through the bottom of the hopper, a spring pressing upon said plate, a device for varying the pressure of said spring against said plate, a vertical shaft supported by the frame and extending through the bottom of the hopper for rotating said plate, a pinion attached to said shaft below the hopper, a horizontal shaft journaled in said frame arranged to be rotated as an incident to movement of the device, and a pinion on said horizontal shaft meshing with the pinion on the vertical shaft whereby the vertical shaft will be rotated by the horizontal shaft.

4. In a device of the character described, a frame, a seed hopper supported by the frame having a discharge opening through the bottom thereof, a plate revolubly supported upon the bottom of the hopper and having an annular series of holes therein arranged to receive seed contained in the hopper and successively discharge the seed through said opening through the bottom of the hopper, a vertical shaft supported by the frame and extending through the bottom of the hopper for rotating said plate, a spring pressing on said plate at opposite sides of said vertical shaft, a device for varying the pressure of said spring upon said plate, a pinion attached to the vertical shaft below the hopper, a horizontal shaft journaled in said frame, a pinion on the horizontal shaft meshing with the pinion on the vertical shaft, and means for rotating the horizontal shaft and thereby said vertical shaft and said plate as an incident to movement of the device.

5. In a device of the character described, a frame, a seed hopper mounted on the frame and having a discharge opening through the bottom thereof, a plate revolubly supported upon the bottom of the seed hopper and having an annular series of holes therethrough arranged to receive seed and discharge the seed successively through said opening through the bottom of the hopper, a vertical shaft supported by the frame and extending through the bottom of the hopper for rotating said plate, a spring plate attached to said vertical shaft and having its ends bearing upon and pressing said plate against the bottom of the hopper, a device on said vertical shaft for varying the pressure of said spring upon said plate, a pinion attached to said shaft below the hopper, a horizontal shaft journaled in said frame, and a pinion on said horizontal shaft meshing with the pinion on the vertical shaft.

6. In a device of the character described, a frame, a seed hopper mounted on the frame and having a discharge opening through the bottom thereof, a plate revolubly supported upon the bottom of the seed hopper and having an annular series of holes therethrough arranged to receive seed and discharge the seed successively through the opening through the bottom of the hopper, a vertical shaft supported by the frame for rotating said plate to register the holes therethrough successively with the opening through the bottom of the hopper, a spring plate attached to said vertical shaft and having its ends bearing upon and pressing said plate against the bottom of the hopper, a device on said vertical shaft for varying the pressure of said spring upon said plate, a brush supported in the hopper adjacent to the opening for causing the discharge of seed through said opening, a pinion on said vertical shaft, a horizontal shaft journaled in said frame and arranged to be rotated as an incident to movement of the device, and a pinion on said horizontal shaft meshing with the pinion on the vertical shaft.

7. In a device of the character described, a seed hopper having a discharge opening through the bottom thereof, a plate revolubly supported upon the bottom of the seed hopper and having a hole therein to receive seed contained in the hopper and to discharge the seed through said opening through the bottom of the hopper, a frame upon which the hopper is supported, a vertical shaft supported by the frame and extending through the bottom of the hopper, a device connected with said vertical shaft for varying the pressure of said plate upon the bottom of the hopper, a pinion attached to said shaft below the hopper, a horizontal shaft journaled in said frame, a pinion on said horizontal shaft meshing with the pinion on the vertical shaft whereby the vertical shaft and said plate will be rotated from the horizontal shaft, and means for rotating said horizontal shaft as an incident to movement of the device in planting operations.

Signed at Slater, in the county of Story and State of Iowa, this 25th day of June, 1918.

H. OSMUNDSON.